United States Patent [19]
Critchfield et al.

[11] 3,864,434
[45] Feb. 4, 1975

[54] GRAFT COPOLYMERS OF LACTONE POLYESTERS AND BLENDS WITH POLYVINYL CHLORIDE

[75] Inventors: Frank E. Critchfield, South Charleston; Joseph V. Koleske, Charleston, both of W. Va.

[73] Assignee: Union Carbide Corporation, New York, N.Y.

[22] Filed: Feb. 8, 1974

[21] Appl. No.: 440,799

Related U.S. Application Data

[62] Division of Ser. No. 273,300, July 19, 1972, Pat. No. 3,816,566, which is a division of Ser. No. 109,982, Jan. 26, 1971, Pat. No. 3,760,034.

[52] U.S. Cl.................. 260/899, 117/132, 117/161, 260/29.6 F, 260/29.6 NR, 260/29.6 T, 260/874, 260/876 R, 260/895, 260/898, 260/900, 260/901

[51] Int. Cl. .............................................. C08f 29/24
[58] Field of Search............................ 260/876, 899

[56] References Cited
UNITED STATES PATENTS
3,800,006   3/1974   Katayama et al.................. 260/874

*Primary Examiner*—Murray Tillman
*Assistant Examiner*—C. J. Seccuro
*Attorney, Agent, or Firm*—Bernard Francis Crowe

[57] ABSTRACT

Various ethylenically unsaturated monomers can be graft copolymerized onto lactone polyesters, such as, homopolymers of $\epsilon$-caprolactone or copolymers of $\epsilon$-caprolactone and $\epsilon$-alkyl-$\epsilon$-caprolactones at temperatures between 90 and 150°C. The resultant graft copolymers can be used as plasticizers for polyvinyl chloride resins.

4 Claims, No Drawings

GRAFT COPOLYMERS OF LACTONE POLYESTERS AND BLENDS WITH POLYVINYL CHLORIDE

This is a division of Ser. No. 273,300 filed on July 19, 1972 now U.S. Pat. No. 3,816,566 which in turn is a division of Ser. No. 109,982 filed on Jan. 26, 1971, now U.S. Pat. No. 3,760,034.

BACKGROUND OF THE INVENTION

This invention pertains to graft copolymers of lactone polyesters and more particularly to copolymers obtained with lactone polyesters and ethylenically unsaturated monomers.

Although lactone polyesters have shown considerable potential in the polymer industry they have been found to be somewhat deficient as adhesives to various substrates. In vinyl resin technology these interesting polymers were found to evince excellent plasticizing properties but their tendency to crystallize upon storage caused their separation from the base resin.

It is therefore an object of this invention to enhance the adhesive properties of lactone polyesters.

It is another object of this invention to modify the tendency of lactone polyesters to crystallize in vinyl resin compositions.

It is still another object of this invention to prepare graft copolymers of lactone polyesters, such as ε-caprolactone homopolymer or, copolymers of ε-alkyl-ε-caprolactone.

SUMMARY OF THE INVENTION

It has now been found that the objects of this invention can be satisfied by synthesizing graft copolymers of lactone polyesters having graft copolymerized thereon about 1 to 20% by weight of an ethylenically unsaturated monomer having the general formula:

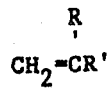

wherein R is a monovalent radical such as hydrogen, halogen or methyl and R' is a monovalent radical such as —COOH, —COOR",

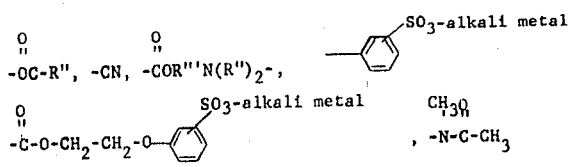

halogen, phenyl or pyridyl, R" being an alkyl radical containing 1 to about 18 carbon atoms and R''' being an alkylene radical containing 1 to about 6 carbon atoms.

The grafting of ethylenically unsaturated monomers onto lactone polyesters can be accomplished by heating lactone polyesters having a molecular weight of about 5,000 to 150,000 and a reduced viscosity of about 0.2 to 2.0 dl./gm. (measured as a 0.2% solution in benzene at 30°C.) with about 1 to about 20% by weight of an ethyleneically unsaturated monomer and 0.1 to 1% by weight, based on the total composition, of a free radical initiator at a temperature of about 90°–150°C. for at least 30 minutes. It is preferred to carry out these graft polymerizations, where possible, in bulk inasmuch as this techinque has a deterrent effect on the tendency of the ethylenically unsaturated monomers to homopolymerize. However it is not de rigeur to use bulk polymerization and other techniques such as solution, suspension, or emulsion polymerization can be used if desired.

Examples of ethylenically unsaturated monomer which are suitable for graft polymerization onto lactone polyester backbones include alkyl acrylates having up to 18 carbon atoms in the alkyl group, alkyl methacrylates containing up to 18 carbon atoms in the alkyl group, styrene, vinyl halides, vinylidene halides, alkali metal ar-(methacryloxyethoxy) benzene sulfonates, alkali metal ar-(acryloxyethoxy)benzene sulfonates, N-methyl-N-vinyl acetamide, alkali metal vinyl benzene sulfonates, vinyl pyridines, lower alkyl substituted vinyl pyridines, dialkylaminoalkyl acrylates or methacrylates, acrylonitrile, methacrylonitrile, vinyl esters of aliphatic acids, the latter containing up to about 18 carbon atoms, and alpha, beta-ethylenically unsaturated carboxylic acids, and the like.

Representative alkyl acrylates which can be used as the ethylenically unsaturated monomer in the above-described graft copolymerization include methyl acrylate, ethyl acrylate, propyl acrylate, butyl acrylate, 2-ethylhexyl acrylate, decyl acrylate, tetradecyl acrylate, octadecyl acrylate, and the like. Representative alkyl methacrylates which can be used as ethylenically unsaturated monomers in the above-described graft copolymerization include methyl methacrylate, ethyl methacrylate, isopropyl methacrylate, n-butyl methacrylate, octyl methacrylate, decyl methacrylate, lauryl methacrylate, octadecyl methacrylate, and the like.

Representative vinyl halides include vinyl chloride, vinyl fluoride, vinyl bromide and vinyl iodide. Representative vinylidene halides include vinylidene chloride, vinylidene fluoride, vinylidene bromide and vinylidene iodide.

Preferred dialkylaminoalkyl acrylates and methacrylates which can be grafted onto the lactone polyesters include dimethylaminoethyl methacrylate, diethylaminoethyl acrylate, diethylaminoethyl acrylate, and the like.

Representative vinyl pyridines which can be graft copolymerized with the lactone polyesters include 2-vinyl pyridine, 4-vinyl pyridine, 2-methyl-5-vinyl pyridine, and the like.

Vinyl esters which can be graft copolymerized with the lactone polyesters include vinyl formate, vinyl acetate, vinyl propionate, and the like.

Alpha,beta-ethylenically unsaturated acids which can be copolymerized with the lactone polyesters include acrylic acid, methacrylic acid, maleic acid, crotonic acid, itaconic acid, and the like.

Although it is preferred to employ polymerization times of about 2 to 3 hours, this period can range from about 0.5 to 5 hours if desired.

Polymerization pressure can vary and subatmospheric or superatmospheric pressures can be used as well as ambient atmospheric pressures.

Although the preferred temperature range is about 90° to about 160°C., temperatures as low as about 40°C. and as high as about 250°C. can be used if desired.

The instant process can be carried out as a batch or continuous process.

The preferred free radical polymerization initiators are organic peroxides having a half-life of about 0.5 to 2 hours in the temperature range of about 90° to about 160°C. Specific preferred organic peroxides include di-t-butyl peroxide, dicumyl peroxide, dibenzoyl peroxide and the like.

In addition to the process variables discussed above, viz., polymerization temperature, polymerization free radical initiator, and initiator concentration, the mode of addition of the vinyl comonomer and initiator was also investigated. It was found preferable to add the initiator-vinyl monomer mixture dropwise over the course of several hours to the lactone polyester rather than all at once.

The lactone polyester substrates used in the formation of the graft copolymers of this invention can be made by processes well known in the art such as disclosed in U.S. Pat. No. 3,284,417 which is incorporated herein by reference.

The lactone polyesters used in this invention can be described as having repeating units represented by the formula

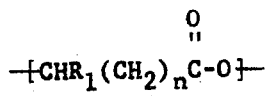

wherein $R_1$ is H or an alkyl group containing 1 to about 6 carbon atoms and n is an integer having a value of at least three, e.g., from three to six. The preferred lactone polyester is poly($\epsilon$-caprolactone) although copolymers of $\epsilon$-caprolactone and an $\epsilon$-alkyl-$\epsilon$-caprolactone, the latter containing about 10 to about 90 weight percent of $\epsilon$-caprolactone copolymerized therein, can also be used.

The lactone polyester graft copolymers of this invention can be used in many diverse applications. For example, acrylic acid or methacrylic acid poly($\epsilon$-caprolactone) graft copolymers show excellent low temperature adhesion to metallic substrates. The efficacy of poly($\epsilon$-caprolactone) as a plasticizer for polyvinyl chloride can be enhanced as to the clarity of the plasticized polyvinyl chloride by grafting alkyl acrylic or methacrylic esters or vinyl esters of aliphatic acids onto the poly($\epsilon$-caprolactone) backbone thus retarding or even eliminating the crystallization of the poly($\epsilon$-caprolactone). Acrylic acid or methacrylic acid poly($\epsilon$-caprolactone) graft copolymers can be readily emulsified for use as coatings or textile sizing agents.

In general the graft copolymers of this invention can also be used as dye assistants for textile fibers and as plasticizers for polyvinyl chloride resins. In this application it is preferred to use polyblends containing about 10 to about 100 parts of graft copolymer per hundred of polyvinyl chloride resin with a range of about 30 to 90 being more preferred. The alkali metal benzene sulfonates described above are particularly useful as dye assistants for such difficult to dye fibers as polypropylene, polyethylene terephthalates, nylon, and the like. When graft copolymers containing sodium ar-(methacryloxyethoxy)benzene sulfonate was blended with such fibers, they were successfully dyed with disperse and basic dyes. Specific dyes which were used included Latyl Orange 3R, Celliton Fast Red GGA, Eastman Fast Yellow GLF, Eastman Polyester Red 2G, and Sevron Blue 5G.

A further advantage in the use of acrylic acid ester or vinyl ester polycaprolactone graft copolymers as plasticizers for polyvinyl chloride resins was demonstrated by reduced aging phenomena.

The invention is further described in the Examples which follow. All parts and percentages are by weight unless otherwise specified.

EXAMPLE 1

A sample of poly($\epsilon$-caprolactone) for use as the lactone polyester backbone substrates for grafting vinyl monomers was prepared by heating a closed 40 gallon reactor charged with about 20 gallons of $\epsilon$-caprolactone monomer containing 1.0 weight per cent of diethylene glycol, 300 parts of water per million parts of $\epsilon$-caprolactone, and 400 parts of stannous dioctanoate per million parts of $\epsilon$-caprolactone, for 1 hour at 150°C. and then for 6 hours at 180°C. The resultant poly($\epsilon$-caprolactone) had a number average molecular weight of about 10,000 and a reduced viscosity (measured as a 0.2% solution in benzene at 30°C.) of 0.3 dl/gm.

In a 500 ml 3-necked, resin flask equipped with stainless steel anchor-type stirrer, gas inlet tube, thermometer, reflux condenser, and addition funnel was charged 200 grams of the poly($\epsilon$-caprolactone) prepared above. The flask was heated to an internal temperature of about 90°C. which melted the poly($\epsilon$-caprolactone) and then 11.3 grams (0.15 mole) of acrylic acid was added all in one portion. Then 1.7 grams (7 millimoles) of dibenzoyl peroxide was added slowly to the mixture under an atmosphere of dry argon. The resulting mixture became very milky in appearance although the viscosity did not appear to change appreciably. After 2.5 hours the melt was poured out of the reaction flask and allowed to cool overnight. The reduced viscosity of the acrylic acid-poly($\epsilon$-caprolactone) graft copolymer obtained was found to be 0.3 dl/gm. when measured as a 0.2% solution in benzene at 30°C. The efficiency of grafting of the acrylic acid monomer onto the poly($\epsilon$-caprolactone) substrate was 27%. This determination was made by extracting the ground graft poly($\epsilon$-caprolactone) copolymer with methanol in a Soxhlet extraction apparatus, the methanol being a solvent for polyacrylic acid, and then titrating a weighed portion of the dried and extracted grafted poly-($\epsilon$-caprolactone) potentiometrically with tetrabutylammonium hydroxide.

EXAMPLE 2

The procedure described in Example 1 was repeated with the exception that 1.7 grams of dicumyl peroxide (6.2 millimoles) was substituted for the dibenzoyl peroxide and the polymerization temperature was 140°C. The resultant acrylic acid-poly($\epsilon$-caprolactone) graft copolymer had a reduced viscosity when measured as above, of 0.29 dl/gm. and the graft efficiency was 52%.

EXAMPLE 3

Example 2 was repeated with the exception that 20 grams (0.28 moles; 10% based on the weight of poly($\epsilon$-caprolactone) of acrylic acid was used. The resultant acrylic acid-poly($\epsilon$-caprolactone) graft copolymer had a reduced viscosity of 0.30 dl/gm. and a graft efficiency of 34%.

EXAMPLE 4

Example 3 was repeated with the exception that 3 grams (12 millimoles) of dicumyl peroxide was used, as the initiator. The reduced viscosity of the resultant acrylic acid-poly(ε-caprolactone) graft copolymer was 0.39 dl/gm., and the graft efficiency was 28%. Unlike the previous examples this product showed considerable branching.

EXAMPLE 5

Example 3 was repeated with the exception that the acrylic acid monomer was added dropwise over a period of 2 hours rather than in 1 portion. The resultant acrylic acid-poly(ε-caprolactone) graft copolymer showed a reduced viscosity of 0.30 dl/gm. and a graft efficiency of 45%. There was some branching in the product but considerably less than that obtained in Example 4.

EXAMPLE 6

Example 3 was repeated with the exception that 0.8 grams (3 millimoles) of dicumyl peroxide was used as the initiator and the acrylic acid monomer was added dropwise over a period of 2 hours rather than in one portion. The resultant acrylic acid-poly(ε-caprolactone) graft copolymer had a reduced viscosity of 0.28 dl/gm. and was obtained in a graft efficiency of 44%. In comparison with Examples 3 and 4 this product showed little or not branching.

EXAMPLE 7

Example 3 was repeated with the exception that 1.0 grams (7 millimoles) of di-t-butyl peroxide was used as the initiator in place of the dicumyl peroxide and the acrylic acid monomer was added in 5 cc. portions over a period of 2 hours. The reduced viscosity of this product was 0.29 dl/gm. and the graft efficiency was 45%. This product showed little or no branching.

EXAMPLE 8

A higher molecular weight sample of poly(ε-caprolactone) was prepared by heating a 40 gallon reactor charged with 20 gallons of ε-caprolactone monomer containing 600 parts of water per million parts of ε-caprolactone, and 2000 parts of stannous dioctanoate per million parts of ε-caprolactone, to 150°C. for 1 hour and then 180°C. for 6 hours. The resultant poly(ε-caprolactone) had a weight average molecular weight of about 40,000 and a reduced viscosity (measured as a 0.2% solution in benzene at 30°C.) of about 0.65 dl/gm.

Using the procedure and apparatus described in Example 1 two hundred grams of the poly(ε-caprolactone) prepared as described in the preceding paragraph was grafted with 6 grams (0.08 moles; 3%) of acrylic acid monomer added dropwise over a period of two hours using 0.2 grams (0.74 millimoles; 0.1%) of dicumyl peroxide as polymerization initiator at a temperature of 140°C. The resultant acrylic acid-poly(ε-caprolactone) graft copolymer had a reduced viscosity of 0.55 dl/gm.

EXAMPLE 9

Using the apparatus and procedure described in Example 1 200 grams of poly(ε-caprolactone) having a reduced viscosity of 0.3 was graft polymerized with 20 grams (0.2 moles) of methyl methacrylate monomer added in one portion at a temperature of 95°C. with a polymerization time of 3 hours and using 3.4 grams (14 millimoles) of dibenzoyl peroxide as the polymerization initiator. The resultant methyl methacrylate-poly(ε-caprolactone) graft copolymer showed a reduced viscosity of 0.37 dl/gm.

EXAMPLE 10

Example 9 was repeated with the exception that 1.0 grams (4 millimoles) of dicumyl peroxide was used in place of dibenzoyl peroxide and the polymerization temperature was 140°C. and the polymerization time 3 hours. The resultant methyl methacrylate-poly(ε-caprolactone) graft copolymer showed a reduced viscosity of 0.37 dl/gm.

EXAMPLE 11

Example 10 was repeated with the exception that 40 grams (0.4 moles) of methyl methacrylate was used. The resultant methyl methacrylate-poly(ε-caprolactone) graft copolymer showed a reduced viscosity of 0.43 dl/gm.

The efficacies of the graft copolymer prepared in Examples 9, 10 and 11 were compared as plasticizers for polyvinyl chloride, having a inherent viscosity of 0.63 dl/gm. (measured in accordance with ASTM D-12-43-60, Method A), with ungrafted poly(ε-caprolactone) having a reduced viscosity of 0.3 dl/gm. To this end, the aforesaid polyvinyl chloride was plasticized with 50% of each of Examples 9, 10 and 11 and ungrafted poly(ε-caprolactone) as Control A, by blending these components on a Wiley two roll mill with a small amount of barium-cadmium stearate heat stabilizer for 15 minutes at 170°C. and then pressing a small portion into a film in a hydraulic press at 175°C. and 25,000 psi. The ungrafted poly(ε-caprolactone)-polyvinyl chloride composition developed a haze after 3 hours indicative of the on-set of crystallization of the ungrafted polycaprolactone. In contrast the graft poly(ε-caprolactone) copolymers prepared in Examples 9 and 10 afforded polyvinyl chloride films which took 10 hours before haziness was first observed and the graft copolymer prepared in Example 11 afforded a polyvinyl chloride film which required 36 hours before the first haziness was developed.

EXAMPLE 12

Using the procedure and apparatus described in Example 1, 200 grams of poly(ε-caprolactone) having a reduced viscosity of 0.3 dl/gm. was graft copolymerized with 30 grams (0.35 moles) of vinyl acetate monomer, added in one portion, with 1.0 grams (4 millimoles) of dicumyl peroxide using a polymerization temperature of 145°C. and a polymerization time of 3 hours. The resultant vinyl acetate-poly(ε-caprolactone) graft copolymer showed a reduced viscosity of 0.35 dl/gm. When polyvinyl chloride, having an inherent viscosity of 0.63 dl./gm. (ASTM D-1243-60, Method A) was plasticized as described above in Example 11 with 50% by weight of the vinyl acetate-poly(ε-caprolactone) graft copolymer and pressed into a film, the resultant plasticizer composition required 50 hours before the on-set of haziness.

EXAMPLE 13

Using the apparatus and procedure described in Example 1 200 grams of poly(ε-caprolactone) having a reduced viscosity of 0.3 was graft polymerized with 40 grams (0.26 moles) of dimethylaminoethyl methacrylate added dropwise over a period of 2.5 hours with 1 gram (4 millimoles) of dicumyl peroxide as polymerization initiator at a polymerization temperature of 140°C. The resultant dimethylaminoethyl methacrylate-poly(ε-caprolactone) graft copolymer had a reduced viscosity of 0.28 dl./gm. This product showed no branching and was obtained in a graft efficiency of greater than 40%.

EXAMPLE 14

A sample of poly(ε-caprolactone) having a number average molecular weight of about 10,600 was prepared by the method described in Example 1 by heating 1979 grams of ε-caprolactone monomer with 21 grams of diethylene glycol and 0.43 grams of stannous dioctanoate at 180°C. for 24 hours. The number average molecular weight was determined by hydroxyl and group analysis.

A portion of the above-described poly(ε-caprolactone) (175 grams) was placed in a resin flask equipped with an anchor-type stirrer. The contents of the flask were heated to 140°C. and agitation begun after the poly(ε-caprolactone) melted. Then 75 grams of n-butyl acrylate and 2.0 grams of dicumyl peroxide were premixed and added to the molten poly(ε-caprolactone) while maintaining a temperature between 137°–142°C. At the end of the reaction the product was transferred to an aluminum try and allowed to cool to room temperature. A weighed portion of the hard white graft copolymer was dissolved in benzene and precipitated by adding the solution to an excess of heptane. The precipitated polymer was washed several times with heptane to remove any butyl acrylate homopolymer that might have formed. The resultant product was a n-butyl acrylate-poly(ε-caprolactone) graft copolymer containing 10% grafted n-butyl acrylate.

EXAMPLE 15

A 204 gram portion of the poly(ε-caprolactone) prepared as described in the first paragraph of Example 8, 1.92 grams of azobisisobutyronitrile and 96 grams of acrylonitrile were dissolved in 1200 grams of benzene. Each of 6 pyrex polymerization pressure bottles was charged with the above-described mixture purged with nitrogen, capped and placed in a constant temperature water bath at 75°C. The graft polymerization was allowed to proceed for 88 hours. The contents of the bottles were cooled to room temperature, diluted with acetone and precipitated into an excess of methanol. The products were washed with methanol and dried at room temperature with a nitrogen purge affording an acrylonitrile-poly(ε-caprolactone) graft copolymer having a reduced viscosity of 0.69 dl./gm. and containing 27.6% of acrylonitrile graft copolymerized as evidenced by a nitrogen analysis.

EXAMPLE 16

In order to demonstrate the compatibility of the acrylonitrile-poly(ε-caprolactone) graft copolymer prepared in Example 15 with other polymers, blends of this graft copolymer with polyvinyl chloride, polystyrene, poly(methyl methacrylate), styrene-acrylonitrile copolymer and polyvinyl acetate were made on a two-roll mill at 160°C. using a 5 minute milling time. The milled blends were sheeted from the mill and compression molded to form plaques for tensile tests. The data shown in the Table I below demonstrates that the acrylonitrile-poly(ε-caprolactone) graft copolymer can be readily combined with a variety of polymers and that it acts as a polymeric plasticizer for polyvinyl chloride.

TABLE I

| Parts of Example 16 Graft Copolymer | Parts of Copolymer Blended | Tensile Strength, psi | Elongation % | Secant Modulus (1%) |
|---|---|---|---|---|
| 100 | None Control C | 3,000 | 9 | 78,000 |
| 20 | 80 parts of polyvinyl chloride | 5,300 | 110 | 154,000 |
| 20 | 80 parts of polystyrene | 4,100 | 3 | 162,000 |
| 20 | 80 parts of polymethyl methacrylate | 6,000 | 5 | 147,000 |
| 20 | 80 parts of styrene-acrylonitrile copolymer | 3,200 | 2 | 177,000 |
| 20 | 80 parts of polyvinyl acetate | 5,300 | 4 | 176,000 |

* ASTM D-638-60T

EXAMPLE 17

90 wt. % ε-caprolactone and 10 wt. % ε-methyl-ε-caprolactone were copolymerized at 180°C. using 0.2% stannous acetate as the catalyst and initiator. When the catalyst was added the reaction mixture exothermed to 225°C. within 10 minutes and then the temperature began to decrease. The copolymer became too viscous to stir so the stirrer was turned off and the reaction system was held in a 190°C. oil bath for approximately 12 hrs. At the end of this time the product was transferred into glass trays and allowed to cool to room temperature. The product was a crystalline solid with a reduced viscosity of 0.86 (0.2 g./dl. in benzene at 30°C.)

200 g. of the above caprolactone copolymer, 85% g. of methyl methacrylate, and 1.7 g. of azobisisobutyronitrile were dissolved in 1140 g. of benzene. The reaction mixture was then charged to 6 pyrex pressure bottles and the bottles were then purged with nitrogen, capped, and then placed in a 60° to 75°C. water bath. The vinyl graft polymerization was then conducted for 140 hrs. At the end of this time the bottles were cooled to room temperature and diluted with acetone. The contents were then poured into methanol to precipitate the graft copolymer. The product was filtered, washed several times with methanol and dried in an air oven at 47°C. The final product was a white solid with a reduced viscosity of 0.61 (0.2 g./dl. in benzene at 30°C.) and contained 16.9 wt. % methyl methacrylate by weight gain.

EXAMPLE 18

162 g. of the caprolactone copolymer from Example 17, 108 g. of acrylonitrile and 2.2 g. of azobisisobutyronitrile were dissolved in 1078 g. of benzene. The reaction mixture was charged to six pyrex pressure bottles. The bottles were purged with nitrogen, capped, and placed in a 75°C. water bath. The graft polymerization was then conducted for 72 hrs. At the end of this time the contents of the bottles were cooled to room temperature and diluted with acetone. The contents were then poured into methanol to precipitate the graft copolymer. The product was filtered and washed several times with methanol and dried at room temperature with a nitrogen purge. The final product was a yellow, fluffy, solid with a reduced viscosity of 0.56 (0.2 g./dl. in dimethylforamide at 30°C.) and contained 37.5% acrylonitrile by nitrogen analysis.

EXAMPLE 19

509 g. of a 23.6% by wt. benzene solution of poly-$\epsilon$-caprolactone (reduced viscosity 0.65 g./dl. in benzene at 30°C.), 135 g. of an 29.6% by weight aqueous solution of sodium ar-(methacryloxyethoxy) benzene sulfonate (NaMABS), 2 g. of benzoyl peroxide, 1.0 g. of potassium persulfate, 1.0 g. of sodium bicarbonate and 100 g. of acetone were mixed at room temperature and the reaction mixture was transferred to three pyrex pressure bottles. The bottles were capped and placed in a 65°C. bath and the graft polymerization was conducted for 72 hrs. At the end of this time the contents of the bottles were diluted with a mixture of acetone and methanol to precipitate the copolymer. The product was filtered and worked several times with methanol and then dried. The final product was a granular, while solid with a reduced viscosity of 2.88 (0.2 g./dl. in dimethylsulfoxide at 30°C.) and contained 13.5% by weight NaMABS by sulfur analysis.

EXAMPLE 20

Blends of poly(vinyl chloride) having an inherent viscosity of 1.0, a thermal stabilizer, and the graft copolymer described in Example 18 in the amounts shown in Table II were prepared on a two-roll mill at 160°C. using a 5 minute milling time for blending of the materials. All aspects (fluxing, banding, bank, roll release, dispersion, and hot strength) of the milling operation were rated as good. The mill materials were sheeted from the mill, and when cool they were straw to amber colored, transparent, and smooth. The blend containing the lower amount of graft copolymer was rigid and the blend containing the larger amount of graft copolymer was flexible. Plaques were compression molded from the milled stock at 170°C. and about 1500 psi pressure. The tensile properties of the blends were determined from these plaques and the results are tabulated in Table II.

TABLE II

| | | |
|---|---|---|
| Parts Poly(vinyl chloride) | 90 | 55 |
| Parts Exp. 18 Copolymer | 10 | 45 |
| Parts Heat Stabilizer | 1.35 | 0.83 |
| Tensile Properties* | | |
| Tensile Strength+ | 4800 psi | 3500 psi |
| Elongation+ | 30% | 240% |
| Secant Modulus (1%) ASTM D-1530 | 161,000 psi | 3100 psi |

*Average of two tests values
+Determined by the method described below rather than the standard ASTM procedure.

Tensile strength and elongation were not determined by ASTM methods. Specimen size was about one-inch wide, 0.020 to 0.030 inch thick and one fourth inch in length. Note that the length dimension is the length of the sample between the jaws of the testing apparatus and should be termed a gauge length as indicated. The tensile testing was done with an Instron tensile tester. These properties were determined at a strain rate of 100% with strain rate in inches per inch per minute.

Tensile strength or ultimate strength is the tensile stress at rupture of a specimen. It is calculated from the load on the specimen at rupture divided by the original cross-sectional area.

Elongation is the extension of the specimen described above at the point of break or rupture. It is calculated in the following manner:

% Elongation = $[(l-l_o)/l_o] \times 100\%$, where $l$ is the length at rupture and $l_o$ is the initial length of the specimen.

Strain rate is the rate at which the sample is being elongated relative to its original dimension. Thus, if a one-inch gauge length sample is used and the crosshead of the testing apparatus is driven at a speed of one inch per minute, the strain rate is the ratio of gauge length to this speed or 1 inch divided by 1 inch per minute, which is a rate of 1 inch per minute. Since we report this value as a percent, multiply this quantity by 100% and obtain a strain rate of 100% for the example given.

EXAMPLE 21

Blends of Poly(vinyl chloride) having an inherent viscosity of 1.0, a thermal stabilizer, and the graft copolymer, of methyl methacrylate onto an epsilon-caprolactone/methyl-epsilon-caprolactone copolymer described in Example 17 were prepared on a two-roll mill in the amounts shown in Table III. Milling time for combination of the ingredients was 5 minutes at 160°C. All aspects of the milling operation were rated as good. The milled materials were sheeted from the mill, and when cool were off-white in color, transparent with a slight haze and smooth in surface texture. Plaques were compression molded from the milled stock at 170°C. and about 2000 psi pressure. The tensile properties of the blends were determined from these plaques and the results are tabulated in Table III.

TABLE III

| | | |
|---|---|---|
| Parts Poly(vinyl chloride) | 90 | 55 |
| Parts | 10 | 45 |
| Parts | 1.35 | 0.83 |
| Tensile Properties* | | |
| Tensile Strength+ | 5,900 psi | 2500 psi |
| Elongation+ | 135% | 245% |
| Secant Modulus (1%) | 170,000 psi | 1,700 psi |

*Average of two test values
+Determined by the method described in Example 20.

The graft copolymer of Example 17, was also submitted for poly(vinyl chloride) plasticizer evaluation at the 70 part graft copolymer per 100 parts poly(vinvyl chloride) level. The results of this evaluation are given in Table IV of this Example.

TABLE IV

| Test | Results | ASTM |
|---|---|---|
| Durometer Hardness A | 91 | D1706 |
| Durometer Hardness D | 52 | D1706 |
| Brittle Temperature | −24°C | D746 |
| $T_4$ Temperature | +27°C | D1043 |
| $T_f$ Temperature | 0°C | D1043 |
| Stiffness Modulus (Secant Modulus, 1% Extension) | 8900 psi | D1530 |
| SPI Volatility 24 hr., 70°C, 4 mil (SPI-VD-T8) | 0.1% | D1203 |

EXAMPLE 22

1000 Grams of a 20% by weight benzene solution of the ε-methyl-ε-caprolactone copolymer described in Example 17 85.7 gm of styrene, and 342.8 gm of benzene containing 1.714 gm of dissolved azobisisobutyronitrile were placed in a beaker and mixed well. This reaction mixture was then charged to six pyrex pressure bottles, and the charged bottles were purged with nitrogen, capped, and placed in a 60° to 75°C water bath. The vinyl graft polymerization was then conducted for 142 hours. At the end of this time, the bottles were cooled to room temperature. The contents were a light amber colored and moderately viscous. This product was diluted with acetone and then poured into a 91/9 isopropanol/water mixture to precipitate the graft copolymer. The product was then filtered and dried at room temperature. The final product was a white solid that had a reduced viscosity of 0.58 dl./gm. in benzene at 30°C and a concentration of 0.2 gm./dl.

A blend containing 10 parts of the above described lactone graft copolymer and 90 parts of poly(vinyl chloride) having an inherent viscosity (ASTM-D12-43A) of about 1.0 dl./gm. was prepared on a two-roll mill at 160°C using a milling time of 5 minutes. 1.5 Parts of a conventional barium-cadmium aliphatic acid salt polyvinyl chloride heat and light stabilizer was added to the polymers during the hot blending operation. All aspects of the milling operation were rated as good. The cooled mill sheet of the blend was offwhite, transparent, stiff, and smooth. A plaque for tensile testing was compression molded at 170°C. The tensile properties of the blend were 1% secant modulus (ASTM D1530) =163,000 psi, elongation = 150%, and tensile strength 5,300 psi. Tensile strength and elongation were (determined by the method described in Example 20). For comparison, the host poly(vinyl chloride) had a modulus of 180,000 psi. Although it was not measured, the elongation of the host poly(vinyl chloride) would be expected to be less than 10%. Thus, the above described lactone graft copolymer is a good polymeric plasticizer for poly(vinyl chloride).

The utility of acrylic acid-poly(ε-caprolactone) graft copolymers as metal adhesives was demonstrated by bonding aluminum with poly(ε-caprolactone) having a reduced viscosity of 0.65 dl./gm. as control B and comparing this value with the product obtained in Example 8. The peel strength of control B was 3 lbs. per lineal inch as compared with 56 lbs. per lineal inch for aluminum bonded with material from Example 8. Peel strength data were obtained by applying a force to a peeled back section of a aluminum to aluminum laminate bonded with either the control B or Example 8 graft copolymer and measuring the force required to peel one lamina from the other with an Instron Tensile Testing Machine. A suitable method for measuring peel strength is described in ASTM D-903-49. The peel strength data referred to above were obtained at a 2 inch per minute crosshead speed of the Instron Tensile Testing Machine.

Although the invention has been described in its preferred forms with a certain degree of particularity, it is understood that the present disclosure of the preferred forms has been made only by way of example and that numerous changes made be resorted to without departing from the spirit and the scope of the invention.

What is claimed is:

1. Polyblend of polyvinyl chloride and about 10 to about 100 parts of graft copolymer, per hundred of polyvinyl chloride, said graft copolymer comprising:
   a. lactone polyesters having a reduced viscosity of about 0.2 to 2.0 dl./gm., a molecular weight of about 5000 to 150,000 and repeating units having the general formula:

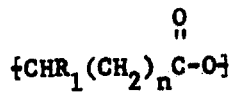

wherein $R_1$ is H or an alkyl group containing 1 to about 6 carbon atoms, and $n$ is an integer having a value of at least 3; and
   b. graft copolymerized thereon about 1 to about 20% by weight based on the weight of said lactone polyesters of an ethylenically unsaturated monomer having the general formula:

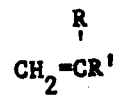

wherein R is a monovalent radical selected from the group consisting of -H and methyl and R' is phenyl.

2. Polyblend claimed in claim 1 wherein the lactone polyester (a) is a copolymer of ε-caprolactone and ε-methyl-ε-caprolactone.

3. Polyblend claimed in claim 1 wherein the monomer (b) isstyrene.

4. Polyblend claimed in claim 2 wherein the monomer (b) is styrene.

* * * * *